United States Patent
Fu et al.

(10) Patent No.: US 9,615,093 B2
(45) Date of Patent: *Apr. 4, 2017

(54) METHOD AND APPARTUS OF ADAPTIVE LOOP FILTERING

(71) Applicant: HFI Innovation Inc., Zhubei, Hsinchu County (TW)

(72) Inventors: Chih-Ming Fu, Hsinchu (TW); Ching-Yeh Chen, Taipei (TW); Chia-Yang Tsai, New Taipei (TW); Yu-Wen Huang, Taipei (TW); Shaw-Min Lei, Zhubei (TW)

(73) Assignee: HFI INNOVATION INC., Zhubei, Hsinchu County (TW)

( * ) Notice: Subject to any disclaimer, the term of this patent is extended or adjusted under 35 U.S.C. 154(b) by 0 days.

This patent is subject to a terminal disclaimer.

(21) Appl. No.: 14/822,026

(22) Filed: Aug. 10, 2015

(65) Prior Publication Data
US 2015/0350648 A1 Dec. 3, 2015

Related U.S. Application Data

(63) Continuation of application No. 13/904,294, filed on May 29, 2013, now Pat. No. 9,154,778, which is a
(Continued)

(51) Int. Cl.
*H04N 19/10* (2014.01)
*H04N 19/115* (2014.01)
(Continued)

(52) U.S. Cl.
CPC ........... *H04N 19/115* (2014.11); *H04N 19/10* (2014.11); *H04N 19/117* (2014.11);
(Continued)

(58) Field of Classification Search
None
See application file for complete search history.

(56) References Cited

U.S. PATENT DOCUMENTS

| 5,446,806 A | 8/1995 | Ran et al. |
| 5,859,979 A | 1/1999 | Tung et al. |
| (Continued) |

FOREIGN PATENT DOCUMENTS

| CN | 101411202 | 4/2009 |
| CN | 101459847 | 6/2009 |
| (Continued) |

OTHER PUBLICATIONS

Chen, C.Y., et al; "CE8 Subtest 2: A Joint Proposal on Improving the Adaptive Loop Filter in TMuC0.9 by Mediatek, Qualcomm, and Toshiba;" Joint Collaborative Team on Video Coding (JCT-VC) of ITU-T SG16 WP3 and ISO/IEC JTC1/SC29/WG11; Jan. 2011; pp. 1-18.

(Continued)

*Primary Examiner* — Reza Aghevli
(74) *Attorney, Agent, or Firm* — McClure, Qualey & Rodack, LLP

(57) ABSTRACT

A method and apparatus receives input data for in-loop processing, where the input data corresponds to reconstructed or reconstructed-and-deblocked coding units of the picture. The input data is divided into multiple filter units and each filter unit includes one or more boundary-aligned reconstructed or reconstructed-and-deblocked coding units. A candidate filter is then selected from a candidate filter set for the in-loop processing. The candidate filter set comprises at least two candidate filters the said in-loop processing corresponding to adaptive loop filter (ALF), adaptive offset (AO), or adaptive clipping (AC). The in-loop processing is then applied to one of the filter units to generate a processed filter unit by using the candidate filter selected to all bound- (Continued)

ary-aligned reconstructed or reconstructed-and-deblocked coding units in said one of the filter units.

19 Claims, 11 Drawing Sheets

Related U.S. Application Data continuation of application No. 13/093,068, filed on Apr. 25, 2011, now Pat. No. 9,094,658.

(60) Provisional application No. 61/454,829, filed on Mar. 21, 2011, provisional application No. 61/449,180, filed on Mar. 4, 2011, provisional application No. 61/440,501, filed on Feb. 8, 2011, provisional application No. 61/429,313, filed on Jan. 3, 2011, provisional application No. 61/392,162, filed on Oct. 12, 2010, provisional application No. 61/390,068, filed on Oct. 5, 2010, provisional application No. 61/332,859, filed on May 10, 2010.

(51) Int. Cl.

| | |
|---|---|
| H04N 19/117 | (2014.01) |
| H04N 19/134 | (2014.01) |
| H04N 19/137 | (2014.01) |
| H04N 19/154 | (2014.01) |
| H04N 19/86 | (2014.01) |
| H04N 19/157 | (2014.01) |
| H04N 19/159 | (2014.01) |
| H04N 19/176 | (2014.01) |
| H04N 19/196 | (2014.01) |
| H04N 19/96 | (2014.01) |
| H04N 19/463 | (2014.01) |
| H04N 19/14 | (2014.01) |
| H04N 19/186 | (2014.01) |
| H04N 19/174 | (2014.01) |
| H04N 19/82 | (2014.01) |
| H04N 19/42 | (2014.01) |

(52) U.S. Cl.
CPC ......... *H04N 19/134* (2014.11); *H04N 19/137* (2014.11); *H04N 19/14* (2014.11); *H04N 19/154* (2014.11); *H04N 19/157* (2014.11); *H04N 19/159* (2014.11); *H04N 19/174* (2014.11); *H04N 19/176* (2014.11); *H04N 19/186* (2014.11); *H04N 19/196* (2014.11); *H04N 19/439* (2014.11); *H04N 19/463* (2014.11); *H04N 19/82* (2014.11); *H04N 19/86* (2014.11); *H04N 19/96* (2014.11)

(56) References Cited

U.S. PATENT DOCUMENTS

| 8,606,028 B2 | 12/2013 | Noda et al. |
| 8,660,174 B2 | 2/2014 | Fu et al. |
| 2004/0076333 A1 | 4/2004 | Zhang et al. |
| 2005/0129122 A1 | 6/2005 | Booth et al. |
| 2008/0008394 A1 | 1/2008 | Segall |
| 2008/0089417 A1* | 4/2008 | Bao ................. H04N 19/176 375/240.16 |
| 2008/0212678 A1 | 9/2008 | Booth et al. |
| 2008/0240252 A1 | 10/2008 | He |
| 2009/0010330 A1 | 1/2009 | Tourapis et al. |
| 2009/0067505 A1 | 3/2009 | Tourapis et al. |
| 2009/0086816 A1 | 4/2009 | Leontaris et al. |
| 2009/0087111 A1* | 4/2009 | Noda ............... H04N 21/23892 382/238 |
| 2009/0141814 A1 | 6/2009 | Yin et al. |
| 2009/0196342 A1 | 8/2009 | Divorra Escoda et al. |
| 2009/0257494 A1* | 10/2009 | Ye ................. H04N 19/147 375/240.12 |
| 2009/0257502 A1* | 10/2009 | Ye ................. H04N 19/147 375/240.16 |
| 2009/0257664 A1 | 10/2009 | Kao et al. |
| 2009/0257668 A1* | 10/2009 | Ye ................. H04N 19/00896 382/233 |
| 2010/0021071 A1* | 1/2010 | Wittmann ........... H04N 19/176 382/232 |
| 2010/0027905 A1 | 2/2010 | Zhang et al. |
| 2010/0060749 A1 | 3/2010 | Srinivasan et al. |
| 2010/0061645 A1 | 3/2010 | Wilkins et al. |
| 2010/0098345 A1* | 4/2010 | Andersson ........... H04N 19/85 382/238 |
| 2010/0158103 A1* | 6/2010 | Ye ................. H04N 19/176 375/240.02 |
| 2011/0274158 A1 | 11/2011 | Fu et al. |
| 2012/0027079 A1* | 2/2012 | Ye ................. H04N 19/597 375/240.02 |
| 2012/0082242 A1* | 4/2012 | Narroschke ........ H04N 19/423 375/240.25 |
| 2012/0093217 A1* | 4/2012 | Jeon ................. H04N 19/46 375/240.02 |
| 2015/0146782 A1 | 5/2015 | Lei et al. |

FOREIGN PATENT DOCUMENTS

| CN | 101543076 | 9/2009 |
| JP | 201135619 | 2/2011 |
| WO | WO 2009/126915 | 10/2009 |
| WO | WO 2010/030744 | 3/2010 |
| WO | WO 2010/034206 | 4/2010 |

OTHER PUBLICATIONS

McCann, K., et al.; "HM3: High Efficiency Video Coding (HEVC) Test Model 3 Encoder Description;" Joint Collaborative Team on Video Coding (JCT-VC) of ITU-T SG16 WP3 and ISO/IEC JTC1/SC29/WG11; Mar. 2011; pp. 1-34.

Chen, C.Y., et al.; "Adaptation between Pixel-based and Region-based Filter Selection;" Joint Collaborative Team on Video Coding (JCT-VC) of ITU-T SG16 WP3 and ISO/IEC JTC1/SC29/WG11; Mar. 2011; pp. 1-6.

\* cited by examiner

|   |   |   |   |   |   |   |   |
|---|---|---|---|---|---|---|---|
| CU | CU | CU | CU | CU | CU | CU | CU |
| FU₁ | | FU₂ | | FU₃ | | FU₄ | |
| CU | CU | CU | CU | CU | CU | CU | CU |
| CU | CU | CU | CU | CU | CU | CU | CU |
| FU₅ | | FU₆ | | FU₇ | | FU₈ | |
| CU | CU | CU | CU | CU | CU | CU | CU |
| CU | CU | CU | CU | CU | CU | CU | CU |
| FU₉ | | FU₁₀ | | FU₁₁ | | FU₁₂ | |
| CU | CU | CU | CU | CU | CU | CU | CU |
| CU | CU | CU | CU | CU | CU | CU | CU |
| FU₁₃ | | FU₁₄ | | FU₁₅ | | FU₁₆ | |
| CU | CU | CU | CU | CU | CU | CU | CU |

*Fig. 6*

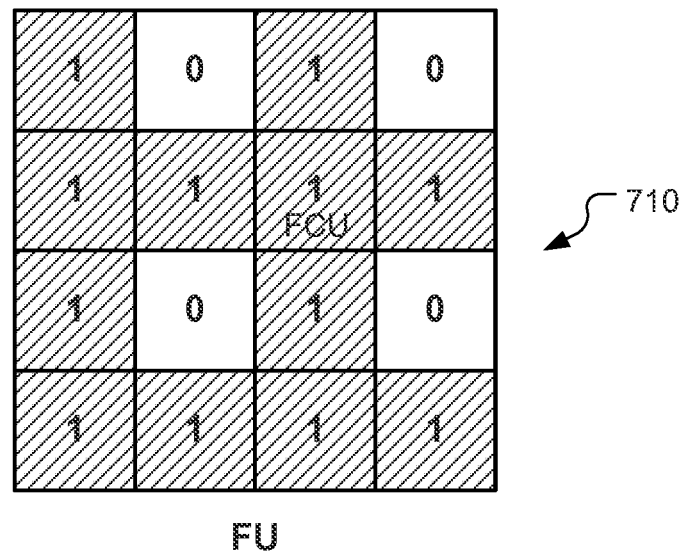
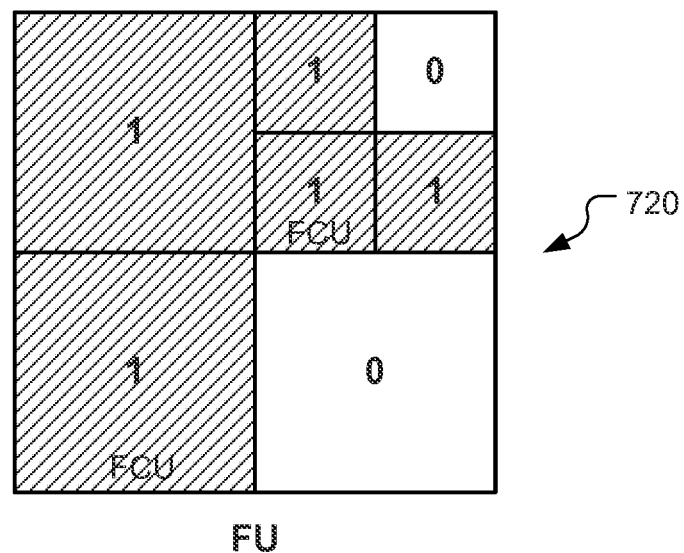
*Fig. 7*

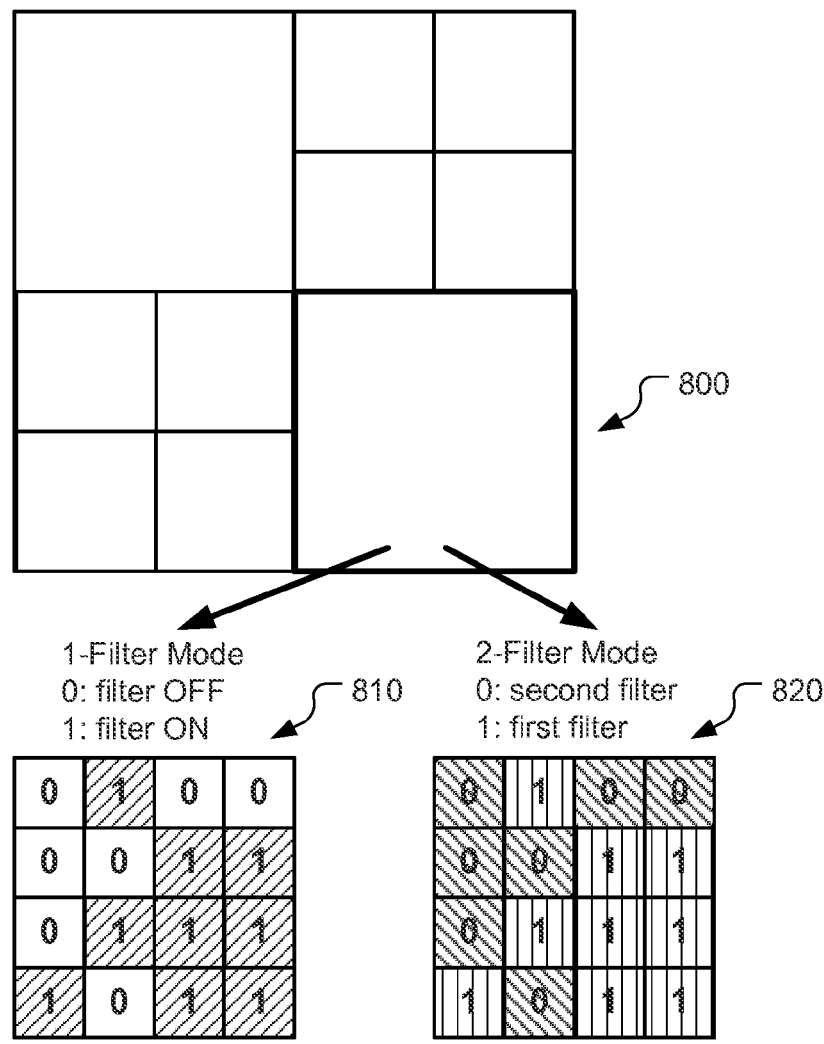
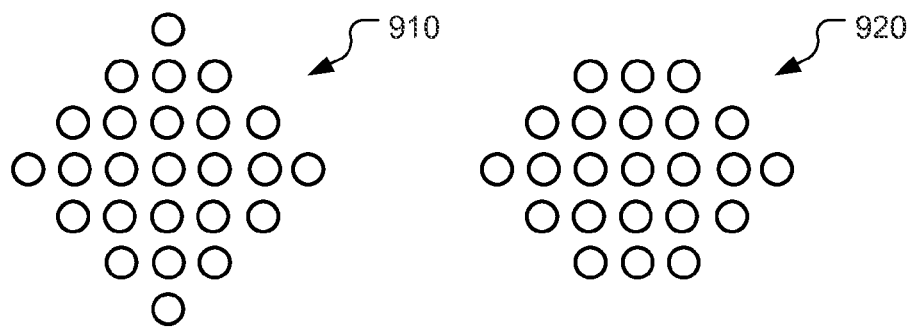
Fig. 9

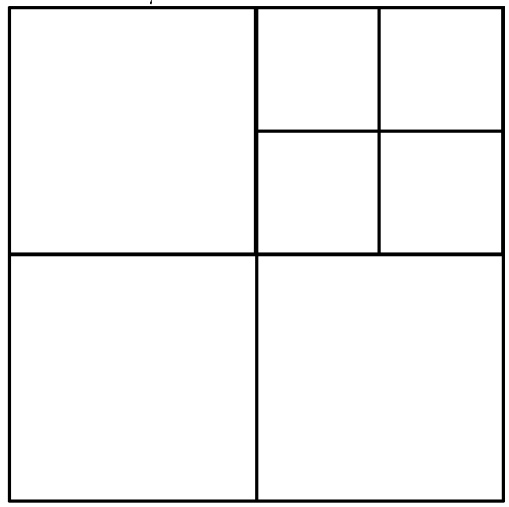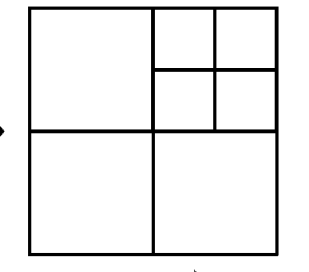
Fig. 10
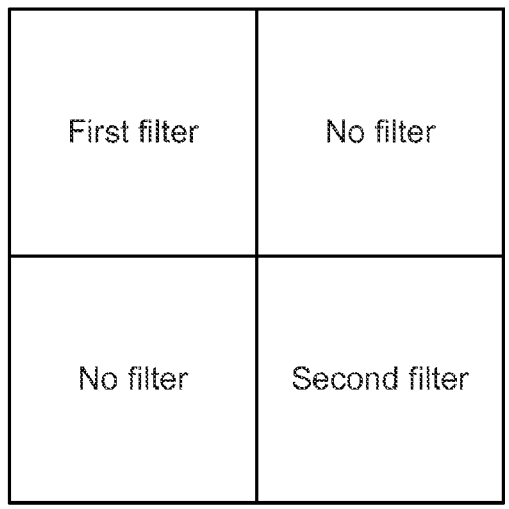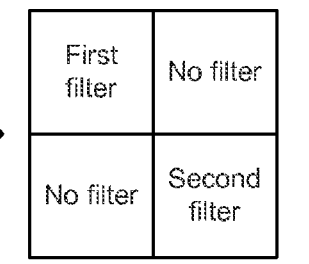
Fig. 11

| Mode 0 | Mode 1 | Mode 0 | Mode 0 |
|---|---|---|---|
| Mode 1 | Mode 0 | Mode 1 | Mode 2 |
| Mode 0 | Mode 2 | Mode 2 | Mode 3 |

Mode 0: Apply $ALF_0$
Mode 1: Apply $ALF_1$
Mode 2: Apply $ALF_2$
Mode 3: Apply $ALF_3$

*Fig. 14*

| QP 22 | QP 22 | QP 22 | QP 22 |
|---|---|---|---|
| QP 24 | QP 23 | QP 22 | QP 24 |
| QP 22 | QP 23 | QP 22 | QP 22 |

QP 22: Apply $ALF_0$
QP 23: Apply $ALF_1$
QP 24: Apply $ALF_2$

*Fig. 15*

| cbf 1 | cbf 0 | cbf 0 | cbf 0 |
|---|---|---|---|
| cbf 0 | cbf 1 | cbf 0 | cbf 0 |
| cbf 0 | cbf 1 | cbf 1 | cbf 1 | cbf 0: Apply $ALF_0$
cbf 1: Apply $ALF_1$

*Fig. 16*

|  $P_1$ | $P_2$ | $P_3$ |
|---|---|---|
| $P_4$ | C | $P_5$ |
| $P_6$ | $P_7$ | $P_8$ |

*Fig. 17*

| e1 | e0 | e1 | e1 |
|---|---|---|---|
| e1 | e0 | e0 | e1 |
| e1 | e0 | e1 | e1 | e0: Apply $ALF_0$
e1: Apply $ALF_1$

*Fig. 18*

METHOD AND APPARTUS OF ADAPTIVE LOOP FILTERING

CROSS REFERENCE TO RELATED APPLICATIONS

The present invention is a continuation of U.S. patent application Ser. No. 13/904,294, filed on May 29, 2013, which is a continuation of U.S. patent application Ser. No. 13/093,068, filed on Apr. 25, 2011, which claims priority to U.S. Provisional Patent Application Ser. No. 61/332,859, filed on May 10, 2010, U.S. Provisional Patent Application Ser. No. 61/390,068, filed on Oct. 5, 2010, U.S. Provisional Patent Application Ser. No. 61/392,162, filed on Oct. 12, 2010, U.S. Provisional Patent Application, Ser. No. 61/429,313, filed on Jan. 3, 2011, U.S. Provisional Patent Application Ser. No. 61/440,501, filed on Feb. 8, 2011, U.S. Provisional Patent Application Ser. No. 61/449,180, filed on Mar. 4, 2011, U.S. Provisional Patent Application, Ser. No. 61/454,829, filed on Mar. 21, 2011. All of the above-referenced utility and provisional patent applications are hereby incorporated by reference in their entireties.

The present invention also includes subject matter that is related to subject matter of U.S. patent application Ser. No. 12/987,151, filed on Jan. 9, 2011, which is hereby incorporated by reference in its entirety.

FIELD OF THE INVENTION

The present invention relates to video coding. In particular, the present invention relates to coding techniques associated with adaptive loop filtering.

BACKGROUND

Motion compensated inter-frame coding has been widely adopted in various coding standards, such as MPEG-1/2/4 and H.261/H.263/H.264/AVC. Motion estimation and compensation as well as subsequent processing in such coding systems are performed on a block basis. During compression process, coding noises may arise due to lossy operations applied such as quantization. The coding artifacts may become noticeable in the reconstructed video data, especially at or near block boundaries. In order to alleviate the visibility of coding artifacts, a technique called deblocking has been used in newer coding systems such as H.264/AVC and the High Efficiency Video Coding (HEVC) system being developed. The deblocking process applies filtering across block boundaries adaptively to smooth the large transitions at and near block boundaries due to coding noises while retaining image sharpness. Furthermore, due to the nature of inter-frame coding, the deblocking process is configured for in-loop operation. In the recent HEVC development, adaptive loop filtering (ALF) is being adopted to process deblocked reconstruction frames. Adaptive loop filtering is used as in-loop processing in addition to deblocking and is often applied after deblocking of reconstructed video data. Adaptive loop filtering is applied to reconstructed video data across multiple frames to reduce visibility of coding artifacts in the temporal domain. The filter coefficients may be designed according to a known optimization algorithm such as Wiener-Hopf equation that minimizes mean square errors between original frames and reconstruction frames.

In the HEVC system, the conventional ALF can be selectively turned ON or OFF for each block in a frame or a slice. The block size and block shape can be adaptive, and the information of block size and block shape can be explicitly sent to decoders or implicitly derived in a decoder. According to a selected performance criterion, determination will be made for each block regarding whether the block is subject to ALF or not. An ALF flag is used to signal the ON/OFF decision for each block so that a decoder can apply ALF accordingly. While ALF has been shown to improve visual quality of reconstructed video, the ALF processing used in the early ALF development was limited where a fixed ALF could only be turned ON or OFF. It is desirable to develop advanced ALF that allows a choice of filter sets, where a filter set can be applied to the reconstructed video data adaptively. Furthermore, it is desirable to develop a new processing unit for the filtering process to apply so that more flexible and/or localized processing can be provided. Furthermore, it is desirable to allow a decoder to derive respective information for applying the filtering process without side information.

BRIEF SUMMARY OF THE INVENTION

A method and apparatus for processing of coded video using in-loop processing are disclosed. Input data to the in-loop processing is received and the input data corresponds to reconstructed or reconstructed-and-deblocked coding units of the picture. The input data is divided into multiple filter units and each filter unit includes one or more boundary-aligned reconstructed or reconstructed-and-deblocked coding units. A candidate filter is then selected from a candidate filter set for the in-loop processing. The candidate filter set comprises at least two candidate filters the said in-loop processing corresponding to adaptive loop filter (ALF), adaptive offset (AO), or adaptive clipping (AC). The in-loop processing is then applied to one of the filter units to generate a processed filter unit by using the candidate filter selected to all boundary-aligned reconstructed or reconstructed-and-deblocked coding units in said one of the filter units. The processed video data comprising the processed filter unit is then provided.

The boundaries of the filter units are also boundaries of the coding units. Two or more of the filter units can be merged as indicated by a merge index to share the candidate filter selected from the candidate filter set. The filter units merged correspond to spatially neighboring filter units. The spatially neighboring filter units are formed by path scanning through the filter units using a scan pattern selected from a group consisting of horizontal scan, vertical scan, z-scan, snake scan, Hilbert scan, a pre-defined scan pattern, and a user-defined scan pattern. The information associated with the scan pattern, a choice of whether to allow use of the merge index, or both are incorporated in a sequence level, a picture level, a slice level, a coding unit level, a filter unit level or a filter control unit level.

In another embodiment, each of the filter units is further partitioned into third blocks corresponding to filter control units. A filter control flag can be associated with each of the filter control units to select one filter from the candidate filter set for applying said in-loop processing. The partition may be based on quadtree partitioning, bock partitioning, prediction unit synchronized partitioning, or transform unit synchronized partitioning. The filter control flag can be used to indicate filter ON/OFF control when one filter is selected for the filter unit. The filter control flag may also be used to indicate one of multiple filters when more than one filter are selected for the filter unit.

The input data may correspond to a first and a second reconstructed or constructed-and-deblocked color components. The first and second reconstructed or constructedand-deblocked color components may share filter information associated with said in-loop processing. The filter information shared may correspond to filter control unit partitioning, filter selection, filter control flag, filter shape, filter coefficients, or a combination of the above. Whether to share the filter information associated with said in-loop processing by the first and second reconstructed or constructed-and-deblocked color components can be enabled or disable according to a sharing switch. Information associated with the sharing switch can be incorporated in a sequence level, a picture level, a slice level, a coding unit level, a filter unit level or a filter control unit level. Also, the filter information associated with the in-loop processing for the second reconstructed or constructed-and-deblocked color component can be derived from the filter information associated with the in-loop processing for the first reconstructed or constructed-and-deblocked color component.

Filter information associated with the in-loop processing can be explicitly incorporated in a bitstream or can be derived implicitly based on the input data according to a selection method. The selection method is indicated by a syntax element in a sequence level, a picture level, a slice level, a coding unit level, a filter unit level or a filter control unit level. The input data can be classified into multiple categories using classification, and one filter is selected from the candidate filter set for each of the categories. The classification can be based on a first characteristic derived from the input data, and the first characteristic is selected from a first group consisting of pixel intensity, edge activity, edge orientation, edge intensity, mode information, quantization parameter, residual energy, regional feature, motion information, and a combination of the above. More than one first characteristics can be adaptively selected for the classification according to a classifier indicator, and the classifier indicator is incorporated in a sequence level, a picture level, a slice level, a coding unit level, a filter unit level or a filter control unit level. The multiple categories can be further classified using a second characteristic derived from the input data, and the second characteristic is selected from a second group consisting of pixel intensity, edge activity, edge orientation, edge intensity, mode information, quantization parameter, residual energy, regional feature, motion information, and a combination of the above, and wherein the second characteristic is different from the first characteristic. The regional feature can be derived according to the characteristics for the filter unit, the coding unit or a pixel location.

BRIEF DESCRIPTION OF THE DRAWINGS

FIG. 6 illustrates exemplary filter units can be dynamically merged to share filter sets.

FIG. 7 illustrates exemplary filter control unit partition where a filter unit can be further divided into filter control units according block partition and quadtree partition.

FIG. 8 illustrates exemplary filter unit partition and exemplary filter control unit partition, where all filter control units in a filter unit share the same candidate filter set and each filter control unit uses a control flag to select a particular filter or to determine filter ON/OFF.

FIG. 9 illustrates exemplary filter shapes that luma and chroma components can share for applying adaptive loop filtering.

FIG. 10 illustrates exemplary filter control regions partition that luma and chroma components can share for applying adaptive loop filtering.

FIG. 11 illustrates exemplary filter control flags that luma and chroma components can share for applying adaptive loop filtering.

FIG. 14 illustrates exemplary classification based on mode information, where each block is classified into multiple categories according to coding mode.

FIG. 15 illustrates exemplary classification based on quantization parameter, where each block is classified into multiple categories according to quantization parameter.

FIG. 16 illustrates exemplary classification based on residual energy, where each block is classified into multiple categories according to residual energy.

FIG. 17 illustrates exemplary classification based on a combination of edge classifier and edge intensity/orientation, where pixels are first classified into multiple categories according to edge classifier followed by edge intensity or orientation.

FIG. 18 illustrates exemplary classification based on regional feature, where the regional feature for each region is derived based on the average edge intensity.

DETAILED DESCRIPTION OF THE INVENTION

For digital video compression, motion compensated inter-frame coding is an effective compression technique and has been widely adopted in various coding standards, such as MPEG-1/2/4 and H.261/H.263/H.264/AVC. In a motion compensated system, motion estimation/compensation and subsequent compression is often performed on a block by block basis. During compression process, coding noises may arise due to lossy operations applied such as quantization. The coding artifacts may become noticeable in the reconstructed video data, especially at or near block boundaries. In order to alleviate the visibility of coding artifacts, a technique called deblocking has been used in newer coding systems such as H.264/AVC and the High Efficiency Video Coding (HEVC) system being developed. The deblocking process applies filtering across block boundaries adaptively to smooth the large transitions at and near block boundaries due to coding noises while retaining image sharpness. Furthermore, due to the nature of inter-frame coding, the deblocking process is configured for in-loop operation.

Figure 1:
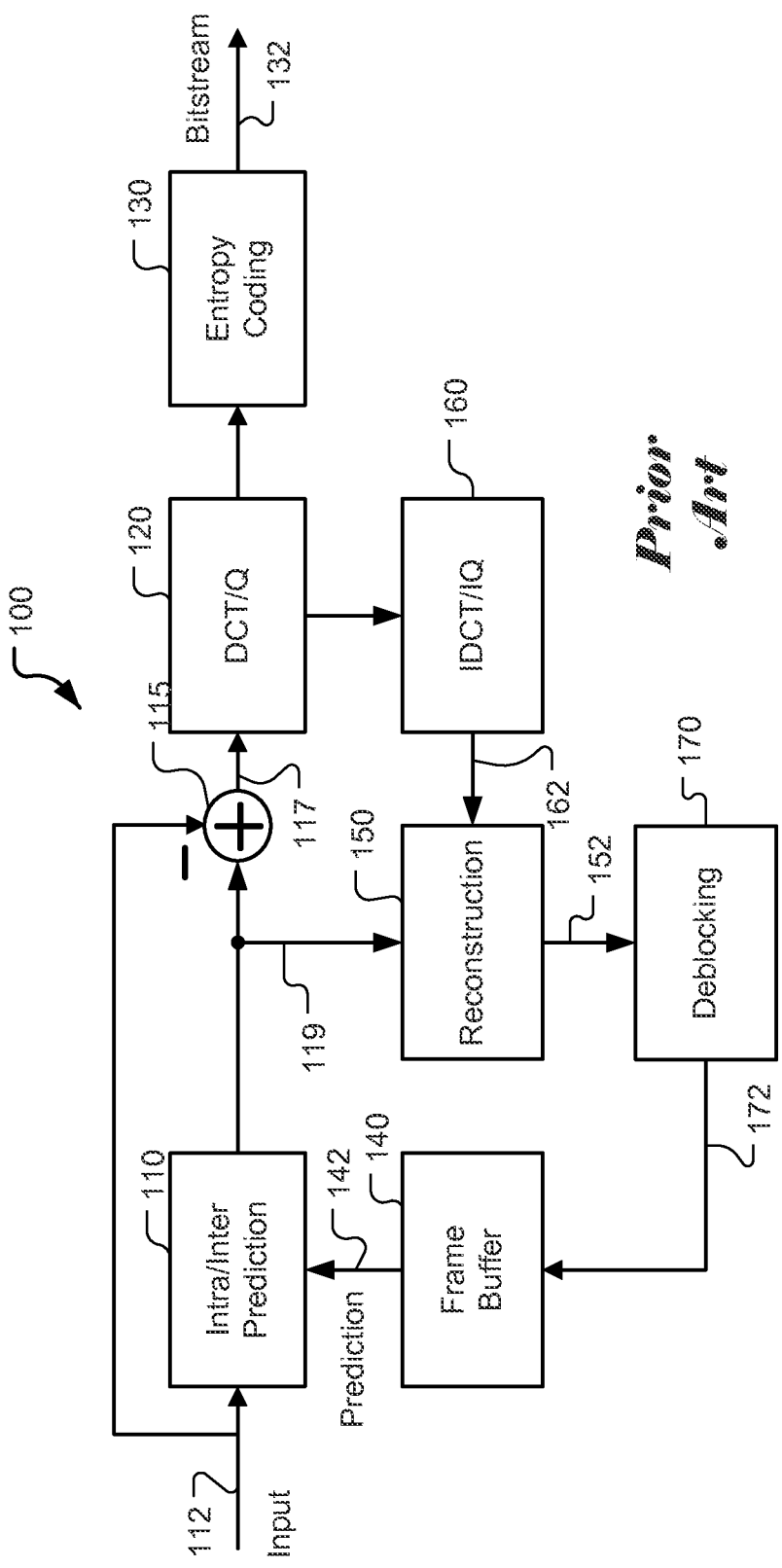
FIG. 1 illustrates an exemplary block diagram of a video coding system based on motion compensated prediction.

FIG. 1 illustrates a system block diagram of motion-compensated video compression with deblocking Compression system 100 illustrates a typical video encoder incorporating intra/inter-prediction, Discrete Cosine Transform (DCT) and entropy coding to generate compressed video data. The input video data enters the encoder through input interface 112 and the input video data is subject to intra/inter-prediction 110. In the intra prediction mode, the incoming video data are predicted by surrounding data in the same frame or field that are already coded. The prediction data 142 from frame buffer 140 correspond to surrounding data in the same frame or field that have already been coded. In the inter prediction mode, the prediction is based on previously reconstructed data 142 in the temporal direction where the reconstructed data 142 are stored in frame buffer 140. The inter prediction can be a forward prediction mode, where the prediction is based on a picture prior to the current picture. The inter prediction may also be a backward prediction mode where the inter prediction is based on a picture after the current picture in the display order. In the inter-prediction mode, the intra/inter prediction 110 will cause the prediction data to be provided to the adder 115 and be subtracted from the original video data 112. The output 117 from the adder 115 is termed the prediction error which is further processed by the DCT/Q block 120 representing Discrete Cosine Transform and quantization (Q). The DCT and quantizer 120 converts prediction errors 117 into coded symbols for further processing by entropy coding 130 to produce compressed bitstream 132, which is stored or transmitted. In order to provide the prediction data for intra/inter prediction, the prediction error processed by the DCT and quantization 120 has to be recovered by inverse DCT and inverse quantization (IDCT/IQ) 160 to provide a reconstructed prediction error 162. In the inter prediction mode, the reconstructed prediction error 162 is added to previously reconstructed video data 119 stored in the frame buffer 140 by the reconstruction block 150 to form a currently reconstructed frame 152. In the intra prediction mode, the reconstructed prediction error 162 is added to the previously reconstructed surrounding data in the same frame stored in the frame buffer 140 to form the currently reconstructed frame 152. The intra/inter prediction block 110 is configured to route the reconstructed data 119 stored in frame buffer 140 to the reconstruction block 150, where the reconstructed data 119 may correspond to a previously reconstructed frame in the temporal direction or reconstructed surrounding data in the same frame depending on the inter/intra mode.

In a coding system, the reconstructed video data 152 usually contains coding noises due to lossy operations such as quantization. Because of block-based processing in the coding system, coding artifacts at and near block boundaries are more noticeable. Such artifacts may propagate from frame to frame. Accordingly, in-loop filtering to "deblock" the artifacts at and near block boundaries has been used in newer coding systems to alleviate the artifacts and improve picture quality. Accordingly, deblocking 170 is shown in FIG. 1 to process the reconstructed video data 152. Due to various operations in the compression system, such as DCT, quantization, inverse quantization, inverse DCT, deblocking processing and loop filtering, the pixel intensity of reconstructed video data may have a mean level shifted and/or an intensity range exceeding the intensity range of the original video data. Therefore, adaptive offset and/or adaptive clipping may also be applied to the reconstructed video data, where adaptive offset and adaptive clipping are not shown in FIG. 1. The adaptive offset and/or adaptive clipping may also be applied before or after deblocking.

In the recent HEVC development, adaptive loop filtering (ALF) is being adopted to process deblocked reconstruction frames. In HEVC, conventional ALF is selectively turned ON or OFF for each block in a frame or a slice. The block size and block shape can be adaptive, and the information of block size and block shape can be explicitly sent to decoders or implicitly derived by decoders. In one approach, the blocks are resulted from quadtree partitioning of LCUs. According to a performance criterion, the video encoder will determine whether a block is subject to ALF or not, and uses an ALF flag to signal the ON/OFF decision for each block so that a decoder can apply ALF accordingly. While ALF has been shown to improve visual quality of reconstructed video, the ALF processing used in the early ALF development was limited where a single adaptive loop filter could only be turned ON or OFF. It is desirable to develop advanced ALF that allows a choice of multiple filter sets that can be applied to the reconstructed video data adaptively. Furthermore, it is desirable to develop a new processing unit for the adaptive loop filtering process to apply so that more flexible and/or localized processing can be provided. Furthermore, it is desirable to allow a decoder to derive respective information for applying the filtering process without side information.

Figure 2:
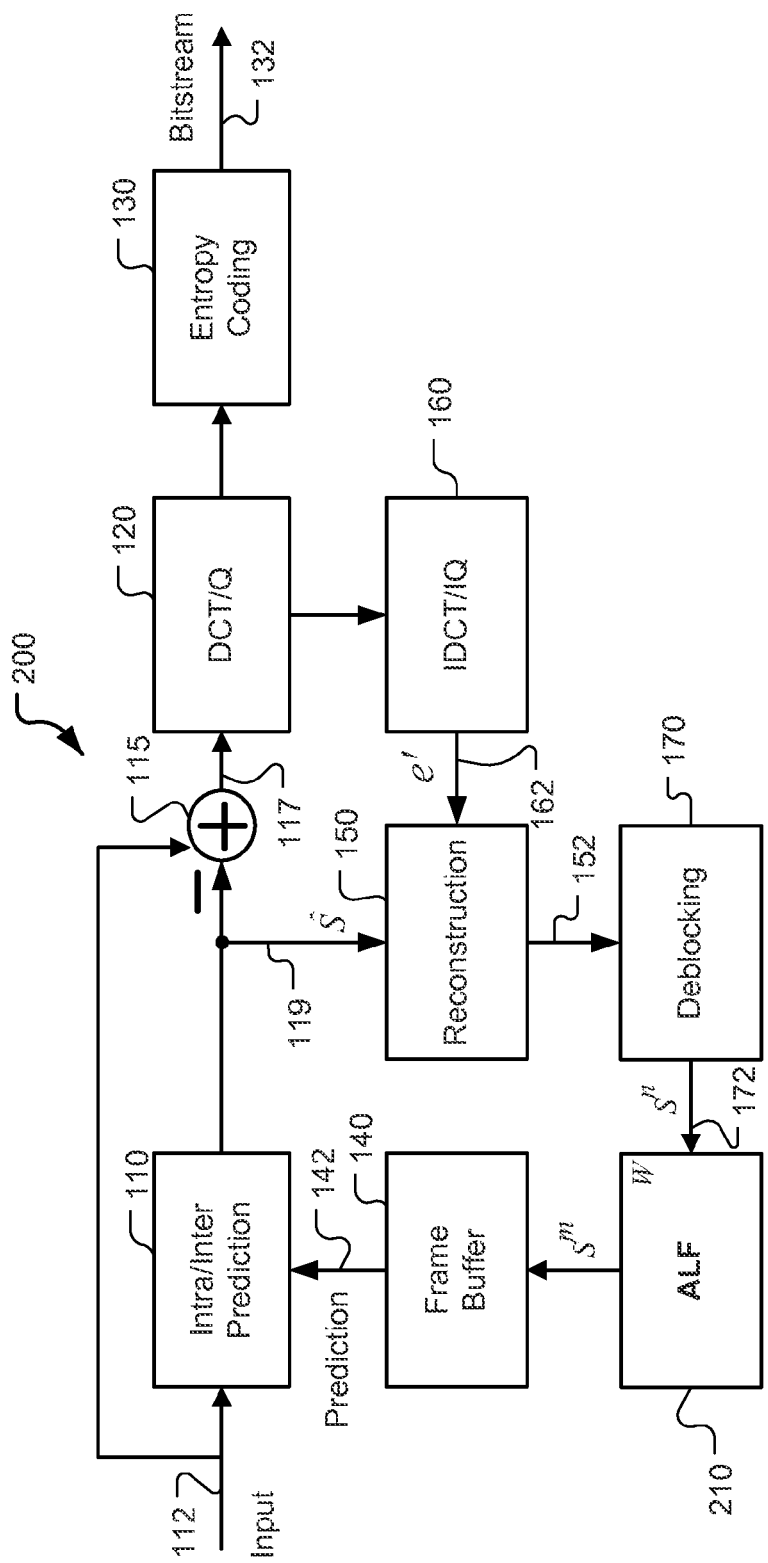
FIG. 2 illustrates an exemplary block diagram of a video coding system based on motion compensated prediction, where adaptive loop filter is incorporated to improve video quality.

Accordingly, a compression system based on HEVC incorporates adaptive loop filtering as in-loop filtering in addition to deblocking. While delocking filter is applied to block boundaries, the adaptive loop filter is applied to pixels in the spatial domain. In HEVC, the conventional adaptive loop filter is only applied to these blocks where the filtering helps to improve performance. For other blocks that adaptive loop filtering does not help to improve performance, adaptive loop filtering is not applied. In this disclosure, the abbreviation ALF may be referring to an adaptive loop filter or adaptive loop filtering. A system block diagram for a coding system incorporating adaptive loop filtering and deblocking is shown in FIG. 2. The reconstructed frame 152 is processed by the deblocking 170 first, where deblocking 170 is configured for in-loop operation. The deblocked reconstructed video data are then filtered by adaptive loop filtering 210. The reconstructed data processed by deblocking and adaptive loop filtering are then stored in the frame buffer 140 as reference video data for processing of subsequent frames. The ALF process can be described according to the following equation:

$$s''' = \sum_{i=1}^{M} w_i \cdot s_i'' + \sum_{i=1}^{N} w_{M+i} \cdot \hat{s}_i + \sum_{i=1}^{O} w_{M+N+i} \cdot e_i' + c,$$

where $S'''$ is the output of the ALF processing, $S''$ is the deblocked video data, $\hat{S}$ is the prediction data, $e'$ is the reconstructed prediction error, and c is a constant. The filter coefficients $w_i$ can be derived according to an optimization algorithm, such as Wiener-Hopf Equation, to optimize the performance, and M, N and O represent the number of filter taps associated with the deblocked video data, the prediction data, and the reconstructed prediction error respectively. As mentioned before, adaptive offset and/or adaptive clipping may also be applied before or after deblocking 170. When adaptive offset and/or adaptive clipping is used, $S''$ refers to the processed video data including adaptive offset and/or adaptive clipping before or after deblocking 170.

According to ALF being considered by HEVC, the loop filtering is performed adaptively on a block by block basis. If loop filtering helps to improve video quality for the underlying block, the block is labeled accordingly to indicate that loop filtering is applied. Otherwise, the block is labeled to indicate that loop filtering is not applied. The filter coefficients usually are optimally designed to match the characteristics of the underlying image area of the picture. For example, the filter coefficients can be designed to minimize the mean square error (MSE) by using Wiener filter, which is a well known optimal linear filter to restore degradation caused by Gaussian noise. In the video compression system, the main distortion is contributed by the quantization noise which can be simply modeled as a Gaussian noise. The filter coefficient design using Wiener filter requires the knowledge of the original signal and the reconstructed signal. The processing unit to derive the filter coefficients is not presented in FIG. 2. The filter coefficients have to be transmitted along with the image area as side information and all blocks in the image area share the same filter coefficients. Consequently, the image area has to be large enough to reduce the overhead information associated with the filter coefficients. In HEVC being currently considered, the image area used for deriving the filter coefficients is usually based on a slice or a frame. In the case of slice for deriving the filter coefficients, the filter coefficient information can be carried in the slice header.

ALF typically uses a two-dimensional (2D) filter. Examples of filter dimension used in practice may be 5×5, 7×7 or 9×9. Nevertheless, filters having other sizes may also be used for ALF. To reduce implementation cost, the 2D filter may be designed to be separable so that the 2D filter can be implemented using two separate one-dimensional filters where one is applied to the horizontal direction and the other is applied to the vertical direction. Since the filter coefficients may have to be transmitted, symmetric filters may be used to save the side information required. Other types of filters may also be used to reduce the number of coefficients to be transmitted. For example, a diamond-shaped 2D filter may be used where non-zero coefficients are mostly along the horizontal and the vertical axes and more zero-valued coefficients are in the off-axis directions. Furthermore, the transmission of filter coefficients may be in a coded form to save bandwidth.

In conventional coding systems, the video data usually are divided into macroblocks and the coding process is applied to macroblocks in an image area. The image area may be a slice which represents a subset of a picture that can be independently encoded and decoded. The slice size is flexible in newer coding standard such as the H.264/AVC. The image area may also be a frame or picture as in older coding standards such as MPEG-1 and MPEG-2. The motion estimation/compensation for conventional coding systems often is based on the macroblock. The motion-compensated macroblock is then divided into four 8×8 blocks and 8×8 DCT is applied to each block. In the H.264 coding standard, the coding process for the macroblock becomes more flexible, where the 16×16 macroblock can be adaptively divided down as small as a block of 4×4 pixels for motion estimation/compensation and coding. In the recent HEVC development, an even more flexible coding structure has been adopted, where the coding unit (CU) is defined as a processing unit and the coding unit can be recursively partitioned into smaller coding units. The concept of coding unit is similar to that of macroblock and sub-macro-block in the conventional video coding. The use of adaptive coding unit has been found to achieve performance improvement over the macroblock based compression of H.264/AVC.

Figure 3:
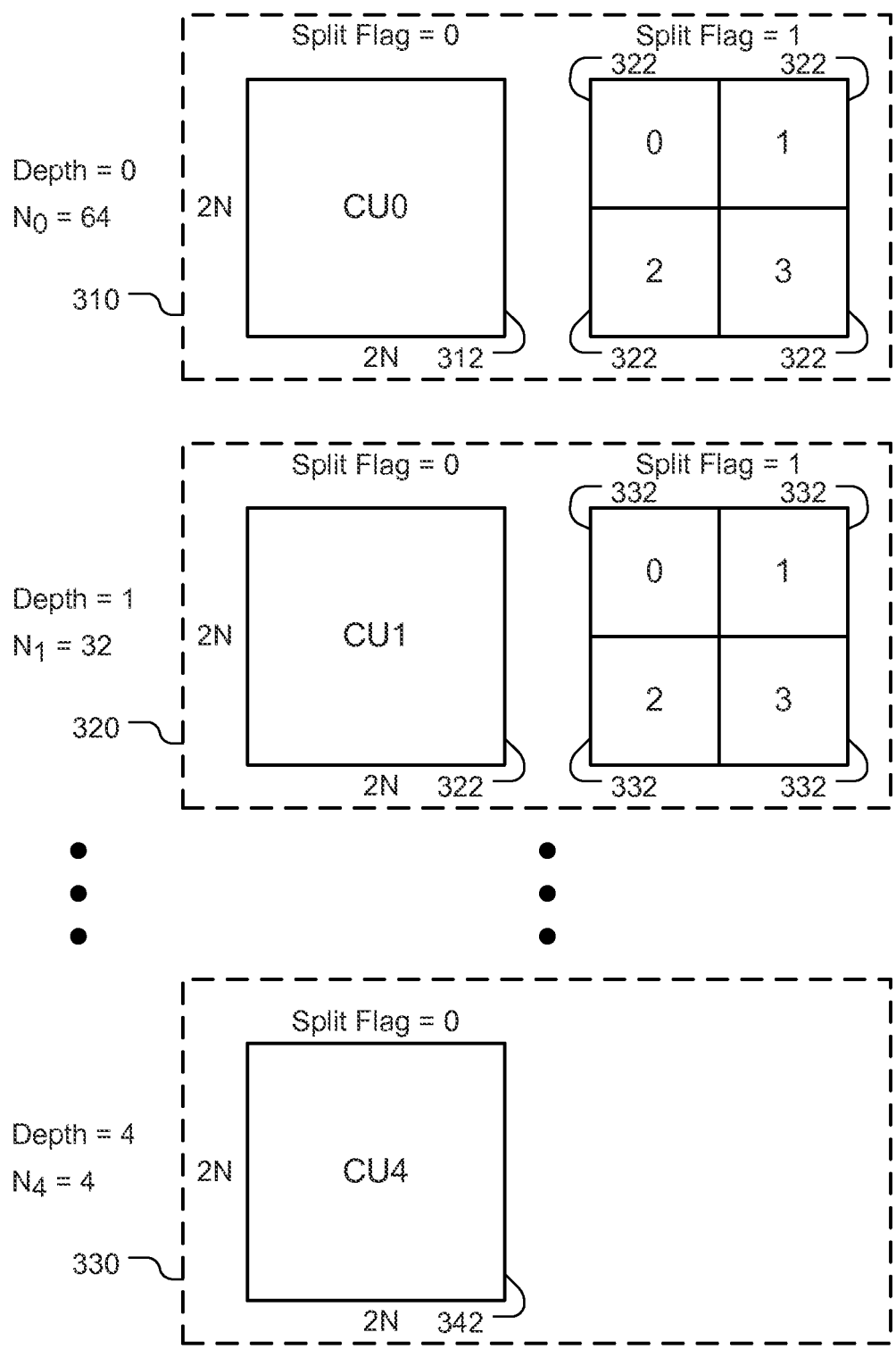
FIG. 3 illustrates an example of coding unit splitting using quadtree.

FIG. 3 illustrates an exemplary coding unit partition based on quadtree. At depth 0, the initial coding unit CU0 312 consisting of 128×128 pixel, is the largest CU. The initial coding unit CU0 312 is subject to quadtree split as shown in block 310. A split flag 0 indicates the underlying CU is not split and, on the other hand a split flag 1 indicates the underlying CU is split into four smaller coding units 322 by the quadtree. The resulting four coding units are labeled as 0, 1, 2 and 3 and each resulting coding unit becomes a coding unit for further split in the next depth. The coding units resulted from coding unit CU0 312 are referred to as CU1 322. When a coding unit is split by the quadtree, the resulting coding units are subject to further quadtree split unless the coding unit reaches a pre-specified smallest CU size. Consequently, at depth 1, the coding unit CU1 322 is subject to quadtree split as shown in block 320. Again, a split flag 0 indicates the underlying CU is not split and, on the other hand a split flag 1 indicates the underlying CU is split into four smaller coding units CU2 332 by the quadtree. The coding unit CU2 has a size of 32×32 and the process of the quadtree splitting can continue until a pre-specified smallest coding unit is reached. For example, if the smallest coding unit is chosen to be 8×8, the coding unit CU4 342 at depth 4 will not be subject to further split as shown in block 330. The collection of quadtree partitions of a picture to form variable-size coding units constitutes a partition map for the encoder to process the input image area accordingly. The partition map has to be conveyed to the decoder so that the decoding process can be performed accordingly.

Figure 4:
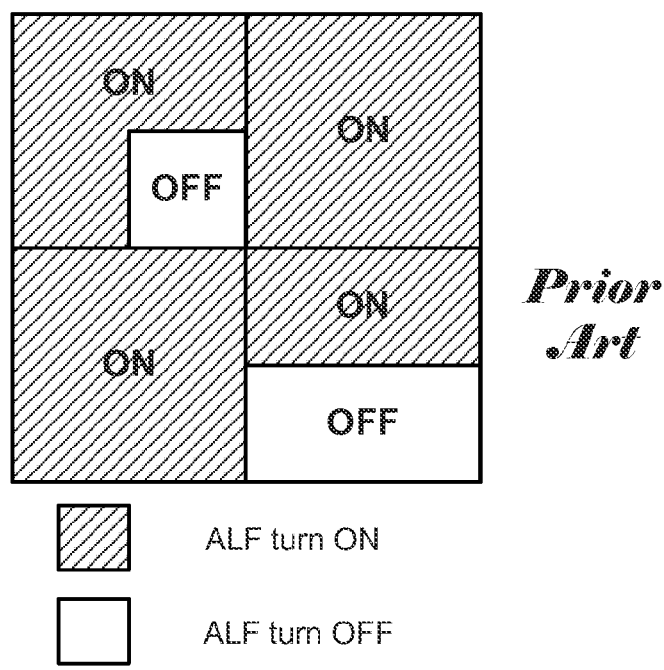
FIG. 4 illustrates an example of conventional adaptive loop filter where ALF is either ON or OFF for each block.

According to HEVC being developed, adaptive loop filtering is applied to pixels on a block basis. If ALF helps to improve the quality for the block, the filter is turned ON for the block, otherwise it is turned OFF. The fixed block size for ALF is easy to implement and does not require side information to transmit to the decoder regarding partitioning the underlying image area. Nevertheless, in a study by Chujoh et al., entitled "Quadtree-based adaptive loop filter", Jan. 2, 2009, ITU Study Group 16—Contribution 181, COM16-C181-E, quadtree based ALF is described which can further improve the performance over the fixed block-based ALF. Partitioning information for ALF has to be transmitted to decoder to synchronize the processing. An alternative image area partition for ALF is described in "Samsung's Response to the Call for Proposals on Video Compression Technology", by McCann et al., Apr. 15-23, 2010, Document: JCTVC-A124. McCann et al. use blocks resulted from the quadtree-partitioned CU for ALF. The partitioning information for the quadtree-based CU is used for ALF partition and it does not require any additional side information for the ALF. ALF partitioning based on CU partitioning is referred to as CU-synchronous or CU-synchronized ALF partition since ALF partitioning is aligned with CU partitioning. Early ALF designs only offered the choice of ALF ON or ALF OFF for a block as shown in FIG. 4. When ALF is based on blocks separately partitioned, side information associated with ALF partition, block size and block location have to be transmitted. The CU-synchronized ALF partition reduces the required side information by adopting the CU structure as the ALF structure. Therefore, filter control information for the CU-synchronized ALF is a control flag associated with each CU to indicate whether the filter is ON or OFF. It is desirable to develop advanced ALF that offers more flexible filter control and/or more filter adaptation instead of ON/OFF only.

In order to further improve the flexibility and performance of the conventional ALF, advanced ALF is developed where the advanced ALF adaptively selects a candidate filter set from multiple filter sets for applying adaptive loop filtering to underlying reconstructed video data according to ALF set selection. The reconstructed video data here may refer to the reconstructed video data provided by the reconstruction unit 150 of FIG. 2. The reconstructed video data here may also refer to processed data by applying deblocking 170 to the output of reconstruction unit 150. Furthermore, additional adaptive offset and/or adaptive clipping may be applied before or after deblocking 170. In one embodiment according to the present invention, the advanced ALF is applied to a new processing unit, named a filter unit (FU) which may be different from the coding unit (CU). However, FU partition may also use the same partition for CU so that no separate side information is required to convey the information associated with FU partition. In an embodiment, boundaries of the filter units are boundaries of the coding units, and each of the filter units contains at least one coding unit. Furthermore, the advance ALF allows each FU to select one of a filter set as a candidate filter to apply loop filtering using the candidate filter. While the boundary alignment techniques mentioned above are for adaptive loop filtering, boundary alignment techniques can also be applied when the filter corresponds to adaptive clipping or adaptive offset.

Figure 5:
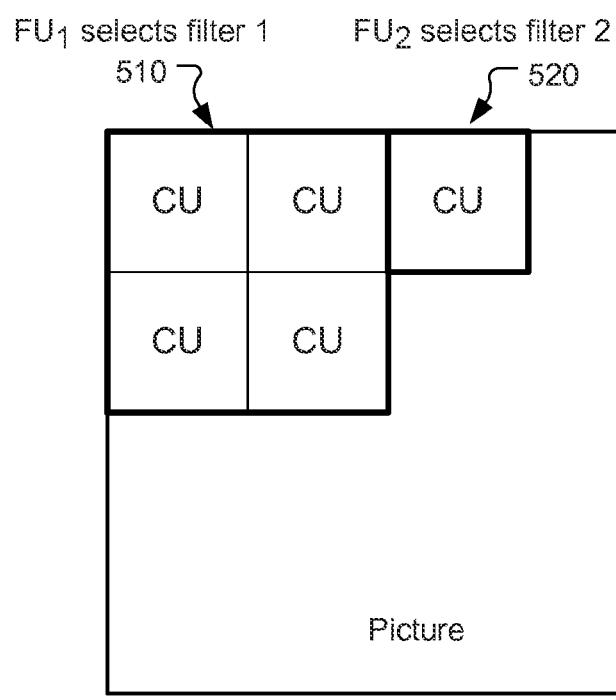
FIG. 5 illustrates an exemplary embodiment according to the present invention, where adaptive loop filtering is applied to filter units and a filter set is selected for each filter unit.

FIG. 5 illustrates an exemplary embodiment according to the present invention where the reconstructed video is partitioned into filter units and a candidate filter is selected for each FU. The filter set may consist of a single filter or multiple filters and ALF set selection is used by each FU to select a candidate filter to apply loop filtering. FU1 510 in this example consists of four CUs and FU2 520 in this example consists of one CU. Each FU selects its own candidate filter, i.e., FU1 510 selects filter 1 and FU2 520 selects filter 2. The use of ALF set selection index provides a compact representation to reduce side information associated with the filter applied. To further reduce the information associated with each FU, an FU may share filter information with other FUs, such as its neighboring FUs having similar characteristics. For example, sixteen FUs are shown in FIG. 6, where neighboring FUs can be merged to share the same candidate filter. The two-dimensional FUs are converted into one-dimensional FUs using a scanning pattern. Neighboring FUs are examined to determine whether the neighboring FUs will be merged to share a same candidate filter. The scanning pattern may be in a horizontal order which results in one-dimensional FUs having index order [1, 2, 3, 4, 5, 6, 7, 8, 9, 10, 11, 12, 13, 14, 15, 16], a vertical order which results in one-dimensional FUs having index order [1, 5, 9, 13, 2, 6, 10, 14, 3, 7, 11, 15, 4, 8, 12, 16], or a z-scan order which results in one-dimensional FUs having index order [1, 2, 5, 6, 3, 7, 4, 8, 9, 10, 13, 14, 11, 12, 15, 16]. Other scanning patterns may also be used, such as snake scan or Hilbert scan, which are well known in the literature. Other pre-defined scan patterns may also be used as well. Furthermore, the scan pattern may also be designed by a user. This user-defined scan pattern may be designed to match the characteristics of the underlying video data for better performance or may be designed for other purposes.

While each FU may select a candidate filter from a filter set for applying ALF, the FU may be partitioned into filter control units (FCUs) where all FCUs in the FU will share the same candidate filter set, the candidate filter set may comprises a single filter or multiple filters. In the case where a FU having a candidate filter set with multiple filters, each FCU in the FU may select an individual filter from the candidate filter set for the FCU. The FCUs can be formed by quadtree partition, block partition, or synchronized to prediction units (PUs) or transform units (TUs). Each FCU can then have its own control flag, filter_sel_idx which is used to select one of multiple filters in the candidate filter set if the candidate filter set contains multiple filters or to indicate filter ON/OFF if the candidate filter set contains a single filter. The use of FCU allows more granular control to improve coding efficiency. An example of FU partitioning into filter control units (FCUs) is shown in FIG. 7, where FU 710 is divided into FCUs using block partition and FU 720 is divided into FCUs using quadtree partition. When block partition or quadtree partition is used, side information is required to convey information associated with FCU partition. A partition flag, filter_split_flag can be used to indicate whether a current FU is split into FCUs. In case that the block partition is used, filter_split_flag=0 indicates no splitting and filter_split_flag=1 indicates splitting the FU into FCU blocks. In case that the quadtree partition is used, filter_split_flag=0 indicates no splitting and filter_split_flag=1 indicates splitting the FU into FCU quadtree partitions.

Each filter in the candidate filter set for a FU may be a new filter associated with the FU. However, sometimes filter(s) optimally designed for a FU may be similar to the FU of a previous picture. Therefore, the filter information for the FU in the previous picture may be reuse and the filter is called a time-delayed filter. Similarly, the current FU may use the filter(s) optimally designed for a previously coded FU in the same picture and the filter is called a space-delayed filter. After the FU is partitioned into FCUs, the filter decision for each FCU is determined according to a filter control flag, filter_sel_idx. For example, if the candidate filter set for the FU consists of two filters, each FCU may use filter_sel_idx to select one of the two filters such as filter_sel_idx=0 for filter 2 selection and filter_sel_idx=1 for filter 1 selection. In the case that only one filter in the candidate filter set, filter_sel_idx=0 may indicate filter OFF for a FCU and filter_sel_idx=1 may indicate filter ON for a FCU. FIG. 8 illustrates the example of filter selection for each FCU mentioned above. The reconstructed video is partitioned into FUs including FU 800. FU 800 is further partitioned into 16 FCUs. FU 810 corresponds to the filter selection case where the candidate filter set contains only one filter and FU 820 corresponds to the filter selection case where the candidate filter set contains two filters. In another embodiment, the FU can be dynamically merged with another FU to share the same filter information. For example, each FU may be assigned a merge index to indicate whether the FU is to be merged with another FU. The filter for the FU may correspond to adaptive loop filter, adaptive clipping or adaptive offset.

The ALF set selection information can be transmitted explicitly or can be configured to allow a decoder to derive the information implicitly. An embodiment according to the present invention allows the ALF set selection information conveyed explicitly or implicitly. An adaptive scheme is used to select the explicit mode or the implicit mode. The ALF method selection index, method_selection_flag can be used to indicate whether the explicit method or the implicit method is used. The ALF method selection information can be carried in the sequence level, picture level, slice level, CU level, FU level or FCU level. Therefore, only method_selection_flag is needed for a corresponding sequence, picture, slice, CU, FU or FCU to indicate whether the explicit mode or the implicit mode is use. For example, method_selection_flag=0 indicates the explicit mode selected and method_selection_flag=1 indicates the implicit mode selected. When the explicit mode is selected, proper syntax is used to indicate the filter selection for the current block. When implicit mode is selected, the ALF set selection information is determined at the encoder based on previously coded information so that the decoder can derive the same ALF set selection information without side information.

To further improve compression efficiency associated with ALF, an embodiment according to the present invention allows luma and chroma components of the underlying video data to share filter information. The filter information to be shared may be filter control region partitions, filter selections or filter ON/OFF, filter characteristics, filter coefficients or a combination of the above information. One means of sharing the filter information between luma and chroma components is to derive the filter information of one component from the other component. Furthermore, the luma/chroma information sharing can be enabled adaptively to optimize the performance. A sharing switch can be used at the sequence level, picture level, slice level, CU level, FU level or FCU level to indicate whether luma/chroma information sharing is enabled or disabled. The filter shape and filter size (e.g. filter length) are considered part of filter characteristics that the luma/chroma components may share. For example, a diamond-shaped filter 910 or another shape 920 may be used by both luma and chroma components as shown in FIG. 9. While the same shape is used, the filter size may have to be properly scaled to take into account of different signal characteristics between luma and chroma components.

When filter control regions, such as filter control units partitioned from a filter unit mention previously, are shared between luma and chroma components, common filter control regions can be designed for both luma and chroma components. Alternatively, the filter control region partition 1020 for the chroma component can be derived from the filter control region partition 1010 for the luma component as shown in FIG. 10. When filter selection, such as filter selection using filter control flag mentioned previously, is shared between luma and chroma components, common filter selection can be designed for both luma and chroma components. Alternatively, the filter selection 1120 for the chroma component can be derived from the filter selection 1110 for the luma component as shown in FIG. 11. When filter coefficients are shared between luma and chroma components, the filter coefficients of luma component can be used to derive the filter coefficients of chroma components. When filter information for one component is used to derive filter information for the other component, the above examples always use the information based on the luma component to derive the information for the chroma component. Nevertheless, it is also possible to use information based on chroma component to derive the information for the luma component.

Figure 12:
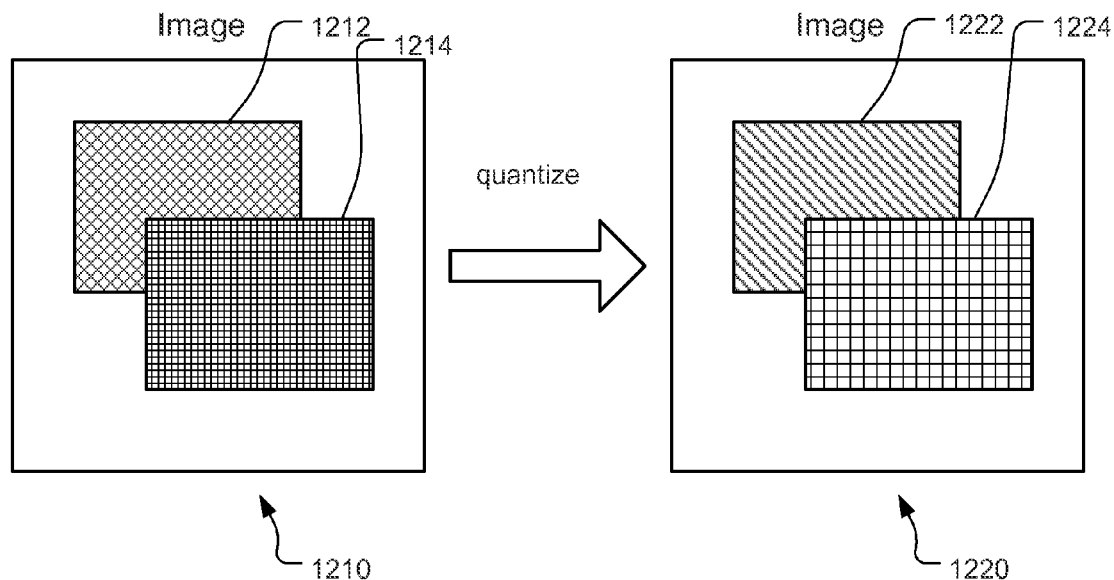
FIG. 12 illustrates exemplary classification based on pixel intensity level, where pixels in an area are divided into two classes according to the intensity level.

The filter selection may also be based on classification of reconstructed video data. If the underlying reconstructed video data involved are associated only with previously coded data, the classification-based filter selection is useful for ALF selection using the implicit mode since the decoder may derive the same classification without side information. When filter selection based on classification is used, the underlying coded video data is classified into multiple categories based on a feature measured from the underlying reconstructed video data. The measured feature may be associated with pixel intensity level, edge orientation, edge intensity, mode information, quantization parameter, residual energy, region location, motion information, or a combination of the above. For example, when the feature is associated with intensity level, class 1 can be defined for pixel intensity levels from 0 to 127 and class 2 can be defined for pixel intensity levels from 128 to 255. In other words, pixels 1212 with intensity levels from 0 to 127 are quantized to one class 1222 and pixels 1214 with intensity levels from 128 to 255 are quantized to another class 1224 as shown in FIG. 12. Picture 1210 is the picture with original intensities and picture 1220 is the corresponding picture with quantized intensities. Accordingly, filter 1 is designed based on pixels in class 1 1222 and filter 2 is designed based on pixels in class 2 1224. After filter 1 and filter 2 are designed, pixels in area 1212 corresponding to class 1 are filtered using filter 1 and pixels in area 1214 corresponding to class 2 are filtered using filter 2. The above intensity level mapping is shown as an example. Other mappings corresponding to different intensity ranges or more classes may also be used to practice the present invention. The measured feature may also be based on motion information such motion vector.

Figure 13:
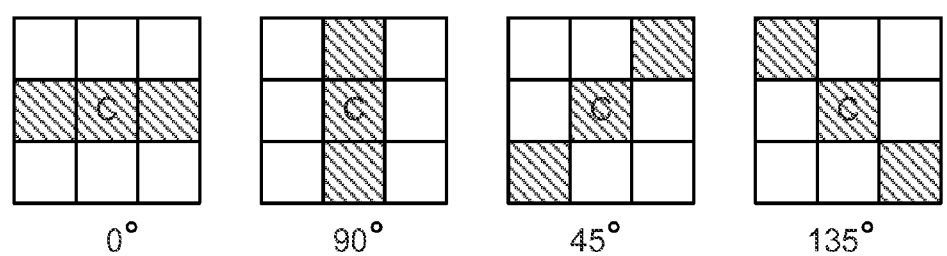
FIG. 13 illustrates exemplary classification based on edge orientation, where pixels of reconstructed video are classified into multiple categories according to edge orientation.

When edge orientation is used as classification for filter selection, a 3×3 pixel window may be used to detect edge or line orientations along 0°, 45°, 90°, and 135° as shown in FIG. 13. There are various known edge- and line-detection operators in the literature. Edge orientation can also be measured by edge activity, relation between neighboring pixel, and sum of Laplacian. In the example of FIG. 13, pixels are classified according to four edge orientations and five classes may be formed to include a case that no edge is detected. Accordingly, five filters can be designed according to the five categories classified. While four orientations are illustrated as an example, more or less edge orientations may be used to practice the present invention. Furthermore, while the edge orientation can be used as classification, edge intensity may also be used as classification. The edge intensity can be measured by edge activity, relation between neighboring pixel, or sum of Laplacian. The classification may be based on characteristics of the edge intensity such as an edge, a valley, a peak or none of the above. The classification into categories may also be performed by quantizing the edge intensity into multiple ranges. For example, the edge intensity may be quantized into four classes and a filter is designed for each class.

The coding mode for each block may also be used for classification. For example, a picture may be divided into regions according intra/inter modes and a dedicated filter can be designed for regions having a same coding mode. The inter mode may be further classified into more regions according to further mode classification such as P mode and B mode. For example, FIG. 14 illustrates an exemplary embodiment according to the present invention where filter selection is according to classification based on mode information. The picture is divided into multiple regions where each region has an associated coding mode. The regions are classified into four classes according to the four modes, i.e., Mode 0 through Mode 3. For example, Mode 0 is intra mode, Mode 1 is inter mode, Mode 2 is skip mode, and Mode 3 is direct mode. A corresponding filter is used for regions in each class. Similarly, quantization parameter (QP) can also be used as classification. FIG. 15 illustrates an exemplary embodiment according to the present invention where filter selection is according to classification based on quantization parameter. In the example, the picture is divided into regions, where each region uses one of three quantization parameters, i.e., QP 22 through QP 24. Accordingly, the regions are divided into three classes. A filter is designed for each class and the filter is applied to all regions in the class. If the picture is coded with more or less QPs, the picture may be classified into more or less classes. Some of the classes may also be merged to form fewer classes. The residual energy associated with prediction errors may also be used for classification. In one example, the residual energy for a region is quantized into one of N intervals to determine one out of N classes for the region, where N is an integer. In yet another example, the residual energy may be compared with a threshold and one class corresponds to regions having all residuals below the threshold and another class corresponds to regions having at least one residual higher than the threshold. Therefore, two filters are used for the two classes respectively as shown in FIG. 16, where cbf stands for coded block flag and regions marked with cbf 0 represent there are zero residues after the prediction process and regions marked with cbf 1 represent there are nonzero residues to be encoded after the prediction process.

A combination of the features of underlying reconstructed video data can also be used for classification. For example, edge classification can be applied to divide pixels into multiple groups first. The classified groups can be further divided into categories by applying another feature such as edge intensity or edge orientation. In one exemplary embodiment according to the present invention, the edge classification is used first to divide pixels in a picture or a region into multiple groups. The edge activity index, GroupIdx is computed from the intensity for a current pixel C and the intensities of its surrounding pixels $P_1, \ldots, P_8$ as shown in FIG. 17 according to:

$$\text{GroupIdx} = f(C, P_1) + f(C, P_2) + \ldots + f(C, P_8) + 8.$$

The function $f(x,y)$ is an operation to map pixel intensities (x,y) into +1, 0 or −1, where $f(x,y)=1$ if x>y, $f(x,y)=0$ if x=y, and $f(x,y)=-1$ if x<y. Consequently, GroupIdx has a range from 0 to 16. The pixels in the picture or the region are divided into 9 groups using a mapping function Index2ClassTable, where Index2ClassTable[17]={1, 1, 2, 2, 3, 3, 4, 0, 0, 0, 5, 5, 6, 6, 7, 7, 8}. The mapping from the computed GroupIdxto to a group indicated by ClassIdx is according to:

$$\text{ClassIdx} = \text{Index2ClassTable}(\text{GroupIdx}).$$

Pixels divided into one of the nine groups by edge classification can be further divided into more categories using edge intensity or edge orientation. For example, group 0 may be further divided into multiple groups according to edge intensity measured using the sum of Laplacian method, Activity=abs $(2C-P_4-P_5)$+abs $(2C-P_2-P_7)$. For example, the Activity can be divided into 7 ranges to divide group 0 into 7 respective groups. Accordingly, the pixels are divided into a total of 15 categories by using a combination of edge classification and edge intensity. While the combination of edge classification and edge intensity is used as an example of combining features for dividing reconstructed video data into more categories, other combinations of features can also be used to practice the present invention. Furthermore, while the first classification results in 9 groups and the second classification results in a total of 15 categories in the above example, the number of groups for the first classification and the total number of groups in the second classification can be any other numbers to practice the present invention.

In yet another example of advanced ALF embodying the present invention is to support adaptation based on a regional feature where the regional feature is derived based on a feature associated with pixels in the region. For example, the regional feature may be based on the average edge intensities (activity) of one region to generate block-based category. In yet another example, the regional feature may be based on the average edge orientation of one region to generate block-based category. Accordingly, regions of a picture can be divided into multiple categories based on the regional feature. FIG. 18 illustrates an example of advanced ALF embodying the present invention, where the regional feature is associated with average edge intensity of pixels in the region. A threshold, di is used to classify the regions into two categories, where regions having average edge intensity≥th are classified as category 0 and regions having average edge intensity<th are classified as category 1. While two categories are shown in FIG. 18 as an example, the average edge intensity may be divided into more categories. While edge intensity and edge orientation are mentioned here as a feature to form regional feature, other features for pixels in the region may also be used to derive regional feature.

While multiple classifiers based on different features can be combined to divide pixels into categories for adaptively applying ALF, the multiple features may also be used selectively according to a flag. For example, the classifier based on regional feature can be used with the classifier based on edge intensity selectively. A flag can be used to indication whether the regional feature or the edge intensity feature is used as classifier for the picture. Furthermore, the picture may be divided into several regions and the classification selection is performed for individual regions. Regions in the same category will share the same filter. The regions can be filter units or coding units. Furthermore, the regions may also be formed based on pixel location. For example, pixels from even columns can be classified as one category and pixels from odd columns can be classified as another category. Similarly, pixels from even lines can be classified as one category and pixels from odd lines can be classified as another category. While regional feature and edge intensity features are mentioned as an example for adaptively selecting a classifier, other classifier pairs or sets of multiple classifiers may also be used to practice the present invention.

The adaptive loop filter scheme described above can be used in a video encoder as well as in a video decoder. In both the video encoder and the video decoder, the reconstructed video data is subject to coding artifacts. The adaptive loop filter scheme described above can help to improve visual quality of the reconstructed video. Embodiments of an encoding system with advanced ALF according to the present invention as described above may be implemented in various hardware, software codes, or a combination of both. For example, an embodiment of the present invention can be a circuit integrated into a video compression chip or program codes integrated into video compression software to perform the processing described herein. An embodiment of the present invention may also be program codes to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware codes may be developed in different programming languages and different format or style. The software code may also be compiled for different target platform. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method for processing video using in-loop processing, wherein a picture is partitioned into coding units for applying coding process to each coding unit, the method comprising:
   receiving input data to said in-loop processing, wherein the input data corresponds to reconstructed or reconstructed-and-deblocked coding units of the picture;
   dividing the input data into multiple filter units, wherein at least one filter unit includes two or more boundary-aligned reconstructed or reconstructed-and-deblocked coding units;
   selecting a candidate filter from a candidate filter set for said in-loop processing, wherein the candidate filter set comprises at least two candidate filters for said in-loop processing corresponding to adaptive loop filter (ALF), adaptive offset (AO), or adaptive clipping (AC);
   applying said in-loop processing to said at least one filter unit including said two or more boundary-aligned reconstructed or reconstructed-and-deblocked coding units using the candidate filter selected to generate a processed filter unit by using the candidate filter selected to all boundary-aligned reconstructed or reconstructed-and-deblocked coding units in said at least one filter unit; and
   providing processed video data comprising the processed filter unit.

2. The method of claim 1, wherein boundaries of the filter units are also boundaries of the coding units.

3. The method of claim 1, wherein two or more of the filter units are merged as indicated by a merge index to share the candidate filter selected from the candidate filter set.

4. The method of claim 3, wherein said two or more of the filter units are spatially neighboring filter units, wherein said spatially neighboring filter units are formed by path scanning through the filter units using a scan pattern selected from a group consisting of horizontal scan, vertical scan, z-scan, snake scan, Hilbert scan, a pre-defined scan pattern, and a user-defined scan pattern.

5. The method of claim 4, wherein information associated with the scan pattern, a choice of whether to allow use of the merge index, or both are incorporated in a sequence level, a picture level, a slice level, a coding unit level, a filter unit level or a filter control unit level.

6. The method of claim 1, wherein each of the filter units is further partitioned into third blocks corresponding to filter control units, and a filter control flag is associated with each of the filter control units to select one filter from the candidate filter set for applying said in-loop processing.

7. The method of claim 6, wherein each of filter units is partitioned into filter control units using quadtree partitioning, bock partitioning, prediction unit synchronized partitioning, or transform unit synchronized partitioning.

8. The method of claim 7, wherein the filter control flag is used to indicate filter ON/OFF control when one filter is selected for the filter unit or the filter control flag is used to indicate one of multiple filters when more than one filter are selected for the filter unit.

9. The method of claim 1, wherein the input data corresponds to a first reconstructed or constructed-and-deblocked color component and a second reconstructed or constructed-and-deblocked color component, and the first reconstructed or constructed-and-deblocked color component and the second reconstructed or constructed-and-deblocked color component share filter information associated with said in-loop processing, and the filter information shared corresponds to filter control unit partitioning, filter selection, filter control flag, filter shape, filter coefficients, or a combination of the above.

10. The method of claim 9, wherein whether to share the filter information associated with said in-loop processing by the first reconstructed or constructed-and-deblocked color component and the second reconstructed or constructed-and-deblocked color component is enabled or disable according to a sharing switch.

11. The method of claim 10, wherein information associated with the sharing switch is incorporated in a sequence level, a picture level, a slice level, a coding unit level, a filter unit level or a filter control unit level.

12. The method of claim 10, wherein the filter information associated with said in-loop processing for the second reconstructed or constructed-and-deblocked color component is derived from the filter information associated with said in-loop processing for the first reconstructed or constructed-and-deblocked color component.

13. The method of claim 1, wherein filter information associated with said in-loop processing is explicitly incorporated in a bitstream or is derived implicitly based on the input data according to a selection method.

14. The method of claim 13, wherein the selection method is indicated by a syntax element in a sequence level, a picture level, a slice level, a coding unit level, a filter unit level or a filter control unit level.

15. The method of claim 14, wherein the input data is classified into multiple categories using classification, and one filter is selected from the candidate filter set for each of the categories, the classification is based on a first characteristic derived from the input data, wherein the first characteristic is selected from a first group consisting of pixel intensity, edge activity, edge orientation, edge intensity, mode information, quantization parameter, residual energy, regional feature, motion information, and a combination of the above.

16. The method of claim 15, wherein more than one first characteristics are adaptively selected for the classification according to a classifier indicator, wherein the classifier indicator is incorporated in a sequence level, a picture level, a slice level, a coding unit level, a filter unit level or a filter control unit level.

17. The method of claim 15, wherein said multiple categories are further classified using a second characteristic derived from the input data, wherein the second characteristic is selected from a second group consisting of pixel intensity, edge activity, edge orientation, edge intensity, mode information, quantization parameter, residual energy, regional feature, motion information, and a combination of the above, and wherein the second characteristic is different from the first characteristic.

18. The method of claim 15, wherein the regional feature is derived according to the characteristics for the filter unit, the coding unit or a pixel location.

19. An apparatus for processing video using in-loop processing, wherein a picture is partitioned into coding units for applying coding process to each coding unit, the apparatus comprising one or more electronic devices configured to:
   receive input data to said in-loop processing, wherein the input data corresponds to reconstructed or reconstructed-and-deblocked coding units of the picture;

divide the input data into multiple filter units, wherein at least one filter unit includes two or more boundary-aligned reconstructed or reconstructed-and-deblocked coding units;
select a candidate filter from a candidate filter set for said in-loop processing, wherein the candidate filter set comprises at least two candidate filters for said in-loop processing corresponding to adaptive loop filter (ALF), adaptive offset (AO), or adaptive clipping (AC);
apply said in-loop processing to said at least one filter unit including said two or more boundary-aligned reconstructed or reconstructed-and-deblocked coding units using the candidate filter selected to generate a processed filter unit by using the candidate filter selected to all boundary-aligned reconstructed or reconstructed-and-deblocked coding units at least one filter unit in said at least one filter unit; and
provide processed video data comprising the processed filter unit.

* * * * *

UNITED STATES PATENT AND TRADEMARK OFFICE
CERTIFICATE OF CORRECTION

PATENT NO. : 9,615,093 B2
APPLICATION NO. : 14/822026
DATED : April 4, 2017
INVENTOR(S) : Fu et al.

It is certified that error appears in the above-identified patent and that said Letters Patent is hereby corrected as shown below:

On the Title Page

Item [54] and in the Specification, Column 1 Line 2 delete "Appartus" and insert --Apparatus--

Signed and Sealed this
Twenty-third Day of May, 2017

Michelle K. Lee
*Director of the United States Patent and Trademark Office*